United States Patent [19]
Pondo

[11] Patent Number: 5,906,898
[45] Date of Patent: May 25, 1999

[54] FINNED INTERNAL MANIFOLD OXIDANT COOLED FUEL CELL STACK SYSTEM

[75] Inventor: Joseph M. Pondo, Bolingbrook, Ill.

[73] Assignee: M-C Power Corporation, Burr Ridge, Ill.

[21] Appl. No.: 08/933,608

[22] Filed: Sep. 18, 1997

[51] Int. Cl.⁶ ..................................................... H01M 8/02
[52] U.S. Cl. ............................................. 429/34; 429/35
[58] Field of Search .................. 429/20, 26, 34, 429/35, 30, 32, 38, 39

[56] References Cited

U.S. PATENT DOCUMENTS

| | | |
|---|---|---|
| 5,213,910 | 5/1993 | Yamada . |
| 5,230,966 | 7/1993 | Voss et al. . |
| 5,232,792 | 8/1993 | Reznikov .................................. 429/14 |
| 5,264,300 | 11/1993 | Barp et al. . |
| 5,300,320 | 4/1994 | Barron et al. . |
| 5,344,721 | 9/1994 | Sonai et al. . |
| 5,418,079 | 5/1995 | Diethelm . |
| 5,432,021 | 7/1995 | Wilkinson et al. . |
| 5,492,277 | 2/1996 | Tani et al. . |
| 5,514,487 | 5/1996 | Washington et al. . |
| 5,527,363 | 6/1996 | Wilkinson et al. . |

*Primary Examiner*—Maria Nuzzolillo
*Assistant Examiner*—Angela J. Martin
*Attorney, Agent, or Firm*—Pauley Peterson Kinne & Fejer

[57] ABSTRACT

A fuel cell stack system comprises a plurality of fuel cell sub-stacks, each of which comprises a plurality of individual fuel cell units. A separator plate separates the fuel cell units between an anode of one fuel cell unit and a cathode of an adjacent fuel cell unit. A single separator plate separates corresponding fuel cell units in each fuel cell sub-stack. The edges of the separator plate extend substantially beyond the periphery of each fuel cell sub-stack forming oxidant flow paths between adjacent separator plates extending from the separator plate edges to the center of the separator plate from which oxidant is then distributed to each of the fuel cell units. By virtue of heat transfer from the extended edges of the separator plate to the oxidant, the heat generated by the fuel cell can be controlled.

12 Claims, 5 Drawing Sheets

FINNED INTERNAL MANIFOLD OXIDANT COOLED FUEL CELL STACK SYSTEM

BACKGROUND OF THE INVENTION

1. Field of the Invention

This invention relates to an internal manifolded oxidant cooled fuel cell stack system in which the edges of the separator plates separating the fuel cell units of each of a plurality of fuel cell sub-stacks are extended to form fins. Pathways are provided for the oxidant gas to flow over the finned portions of the separator plates and into the fuel cell sub-stacks, thereby providing cooling of the fuel cell stack assembly and improved thermal management of the fuel cell stack system.

2. Description of Prior Art

In large fuel cell stack systems, internal stack cooling is a significant problem because of the impact that stack cooling has on the complexity of the stack design and balance of plant requirements. Previous attempts to provide the necessary cooling function in a large fuel cell stack system have included large high temperature oxidant flow, internal fuel reforming, or dedicated cooling plates installed throughout the stack assembly. Each of these approaches has significant technical and economic issues that must be overcome to produce a commercially viable fuel cell stack.

U.S. Pat. No. 5,230,966 to Voss et al. teaches a coolant flow field plate for electrochemical fuel cells comprising, in a major surface, a coolant inlet, a coolant outlet, at least one coolant distribution channel in fluid communication with the coolant inlet and disposed near the perimeter of the plate, and at least one central exhaust channel extending along a diagonal of the coolant flow field plate. The central exhaust channel is proximate to the center of the plate and in fluid communication with the coolant outlet. A plurality of coolant flow channels extend from the coolant distribution channels to the central exhaust channel. The coolant flow field plate is designed to increase the lifetime of solid polymer fuel cells by imposing lower temperatures near the periphery of the cell plates, thereby protecting the integrity of the seals where reactant gases are sealed against external leakage.

U.S. Pat. No. 5,514,487 to Washington et al. teaches an edge manifold assembly comprising a plurality of manifold plates which conduct, introduce and receive reactant and coolant streams to and from an electrochemical fuel cell stack. Each of the fuel cells is provided with a pair of manifold plates, each of which has at least one manifold opening formed therein for containing a fluid and at least one channel formed therein for effecting fluid communication between the manifold opening and the fuel cell to which the manifold plate is attached. The complexity of this approach in terms, for example, of the number of individual components required to make up this system will be apparent to those skilled in the art.

An example of the use of a cooling plate for internally cooling the fuel cell is taught by U.S. Pat. No. 5,344,721 to Sonai et al. This patent teaches a solid polymer electrolyte fuel cell apparatus comprising a fuel cell formed by superposing a plurality of unit cells having a solid polymer electrolyte membrane held between an anode and a cathode and cooling plate adapted to circulate a coolant throughout the interior of the fuel cell and remove the heat produced during regeneration of power. However, in order to be effective, the fuel cell apparatus requires a coolant which is a liquid having a boiling point closely approximating the working temperature of the fuel cell.

Fuel cell batteries having air conduits from a peripheral intake location to a center of the battery are taught by U.S. Pat. No. 5,264,300 to Barp et al. and U.S. Pat. No. 5,418,079 to Diethelm. U.S. Pat. No. 5,213,913 to Yamada teaches a solid electrolyte type fuel cell having gas from gas supply ducts impinging perpendicularly on electrodes.

None of these prior art references provides a solution to the problem of cooling the fuel cell while preheating the oxidant reactant gas in a manner which results in a commercially viable fuel cell stack.

SUMMARY OF THE INVENTION

It is an object of this invention to provide a fuel cell stack system which is capable of simultaneously cooling the fuel cell and preheating the oxidant reactant gas.

It is another object of this invention to provide a means for cooling a fuel cell stack system without utilizing large high temperature oxidant flow, internal fuel reforming or dedicated cooling plates installed throughout the stack assembly.

These and other objects of this invention are achieved by a fuel cell stack system comprising a plurality of fuel cell sub-stacks, each of which comprises a plurality of individual fuel cell units. Each of said fuel cell units comprises an anode, a cathode, and an electrolyte in contact on one side with an electrolyte facing face of the anode and in contact on the opposite side with an electrolyte facing face of the cathode, the electrolyte extending to the periphery of each fuel cell sub-stack. A single separator plate separates a corresponding fuel cell unit of each fuel cell sub-stack from a corresponding adjacent fuel cell unit between the anode of each said corresponding fuel cell unit and the cathode of each said corresponding adjacent fuel cell unit and extends a substantial distance beyond the periphery of each said fuel cell sub-stack. The separator plate comprises a flattened peripheral wet seal structure extending to contact less than about one inch width of the electrolyte on each face of the plate completely around the periphery of the electrolyte of each corresponding fuel cell unit, forming a peripheral wet seal less than about one inch width around each corresponding fuel cell unit of each fuel cell sub-stack under cell operating conditions.

The separator plate forms an anode chamber between the anode facing face of the separator plate and the anode of each corresponding fuel cell unit and forms a cathode chamber between the opposite cathode facing face of the cathode of each corresponding adjacent fuel cell unit. The anode chamber is in gas communication with a fuel gas supply and fuel gas outlet and the cathode chamber is in gas communication with an oxidant gas supply and an oxidant gas outlet. The separator plate together with an adjacent separator plate forms an internal oxidant gas feed path from each peripheral edge of the separator plates to the center of the separator plates. Conduits through the peripheral wet seal structure oriented toward the center region of each separator plate provide oxidant gas communication between each internal oxidant gas feed path and the cathode chamber on one face of the separator plate.

The electrolyte and the separator plate each form a plurality of aligned perforations in each fuel cell unit, the perforations in the separator plate being surrounded by a flattened manifold wet seal structure extending to contact less than about one inch width of the electrolyte on each face of the separator plate, thereby forming a manifold wet seal less than about one inch width under cell operating conditions to form a plurality of gas manifolds extending through each of the fuel cell sub-stacks. Conduits are provided through the extended manifold wet seal structure providing oxidant gas communication between the cathode chambers and an oxidant gas outlet gas manifold. Conduits are also provided through the extended manifold wet seal structure providing fuel gas communication between a fuel gas inlet gas manifold, the anode chambers and a fuel gas outlet gas manifold on the anode side of the separator plate.

The critical elements of the fuel cell stack system of this invention are the separation of a plurality of fuel cell units in a plurality of fuel cell sub-stacks by a common separator plate, the extension of the edges of the separator plates beyond the periphery of each fuel cell unit, thereby providing fins which act as heat exchange surfaces, and the internal oxidant gas feed paths formed by adjacent separator plates extending from the sides of each separator plate to the center thereof.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 4:
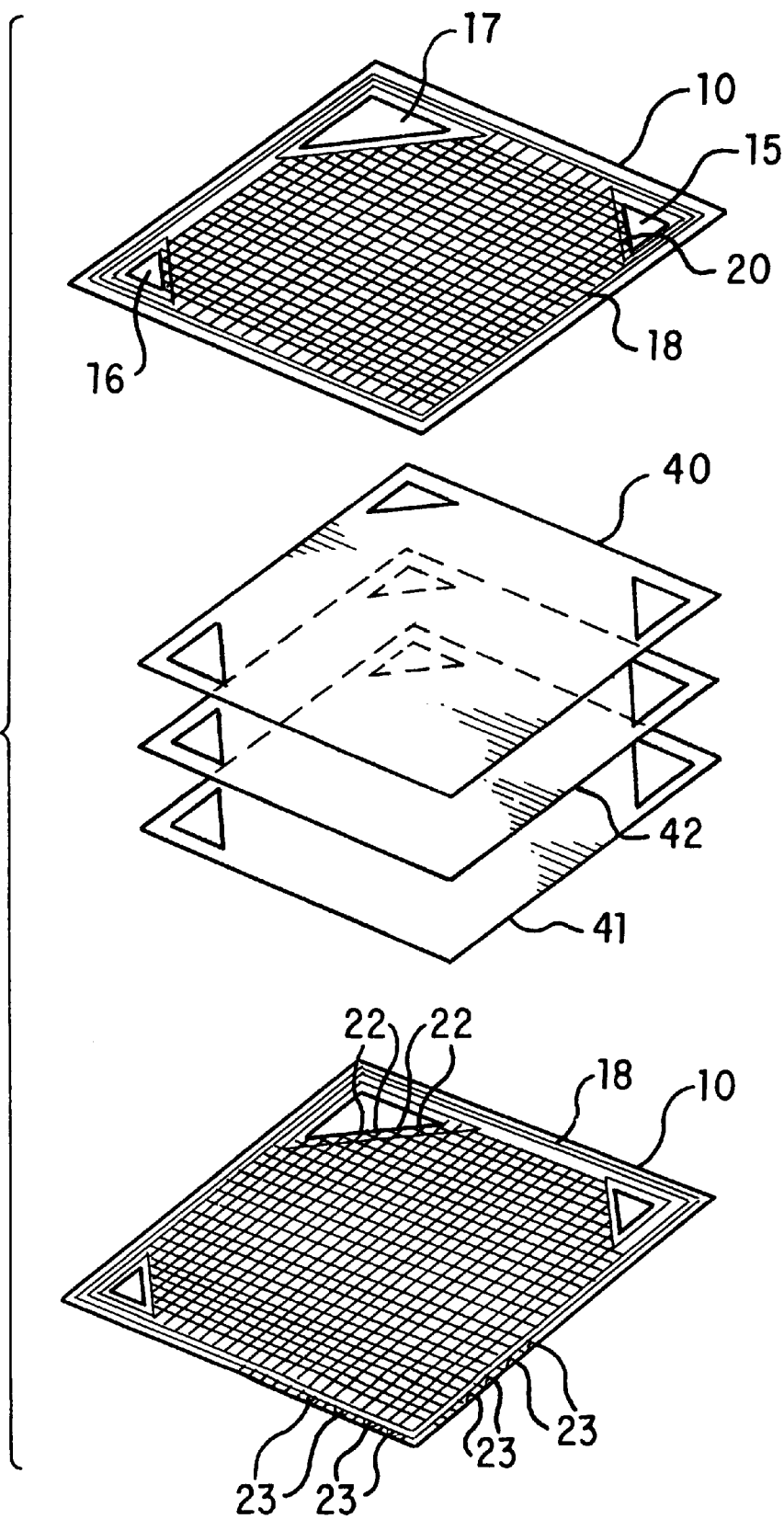
FIG. 4 is an exploded view of a fuel cell unit of a sub-stack of a fuel cell stack system in accordance with one embodiment of this invention.
Figure 5:
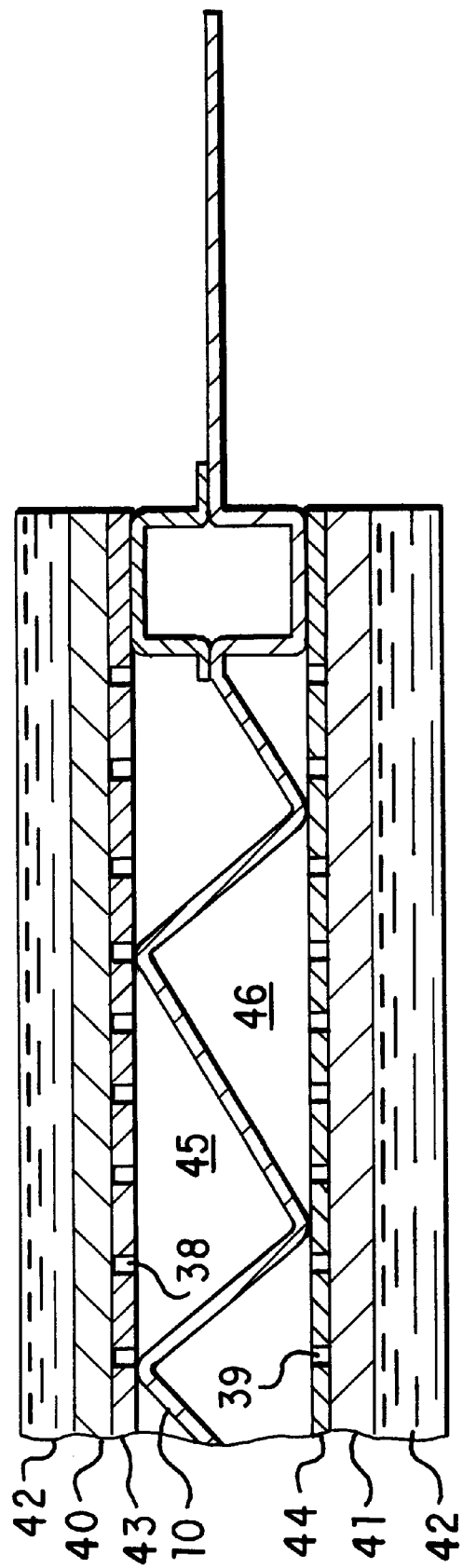
FIG. 5 is a sectional side view of a peripheral wet seal area of a fuel cell unit in accordance with one embodiment of this invention.

The fuel cell stack system of this invention comprises a fuel cell stack assembly comprising a plurality of sub-stacks, each of said sub-stacks comprising a plurality of individual fuel cell units. An exploded view of an individual fuel cell unit of a sub-stack in accordance with one embodiment of this invention is shown in FIG. 4. Each of the fuel cell units comprises anode 40, cathode 41, electrolyte 42 in contact on one side with an electrolyte facing face of anode 40 and in contact on the opposite side with an electrolyte facing face of cathode 41. Separator plate 10 separates the fuel cell units between anode 40 of one fuel cell unit and cathode 41 of an adjacent fuel cell unit as shown in FIG. 5. In accordance with the embodiment shown in FIG. 5, separator plate 10 is corrugated with the peaks on one face of the corrugations adjacent to cathode current collector 44 disposed between separator plate 10 and cathode 41, cathode current collector 44 having perforations 39. Similarly, the peaks on the opposite face of the corrugations of separator plate 10 are adjacent to anode current collector 43 with perforations 38. Separator plate 10 forms an anode chamber 45 between the anode facing face of separator plate 10 and anode 40 and a cathode chamber 46 between separator plate 10 and the opposite cathode facing face of cathode 41 of an adjacent fuel cell unit. Anode chamber 45 is in gas communication with a fuel gas supply and outlet and cathode chamber 46 is in gas communication with an oxidant gas supply and outlet. As shown in FIG. 4, electrolyte 42 and separator plate 10 extend to the peripheral edges of the sub-stack, separator plate 10 having a flattened peripheral wet seal structure 18 extending to contact less than about one inch width of electrolyte 42 on each face of separator plate 10 completely around their periphery, forming a peripheral wet seal under cell operating conditions.

Figure 1:
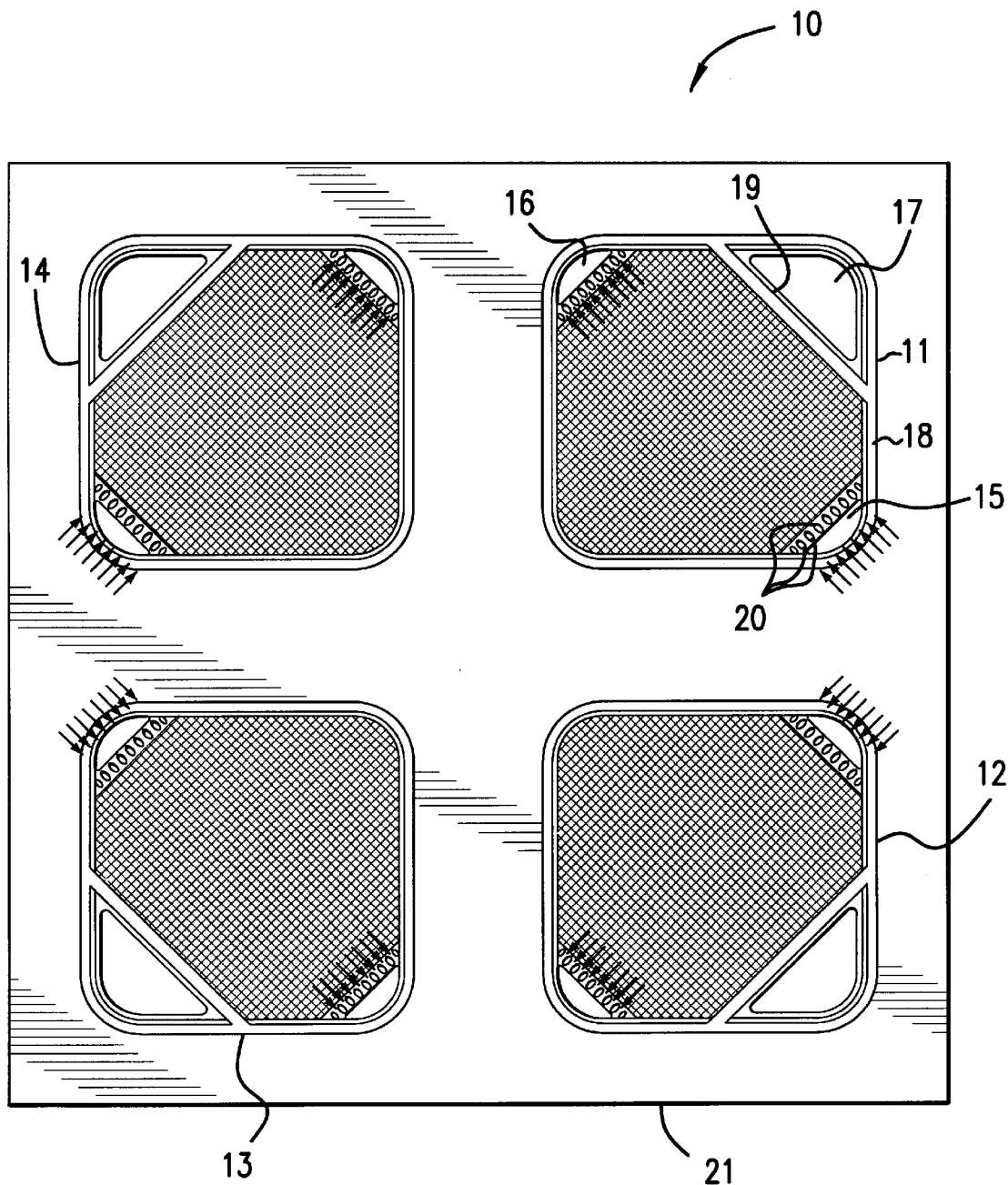
FIG. 1 is a schematic diagram of the anode, or fuel, side of a finned internal manifold oxidant cooled separator plate for a fuel cell stack system in accordance with one embodiment of this invention.
Figure 2:
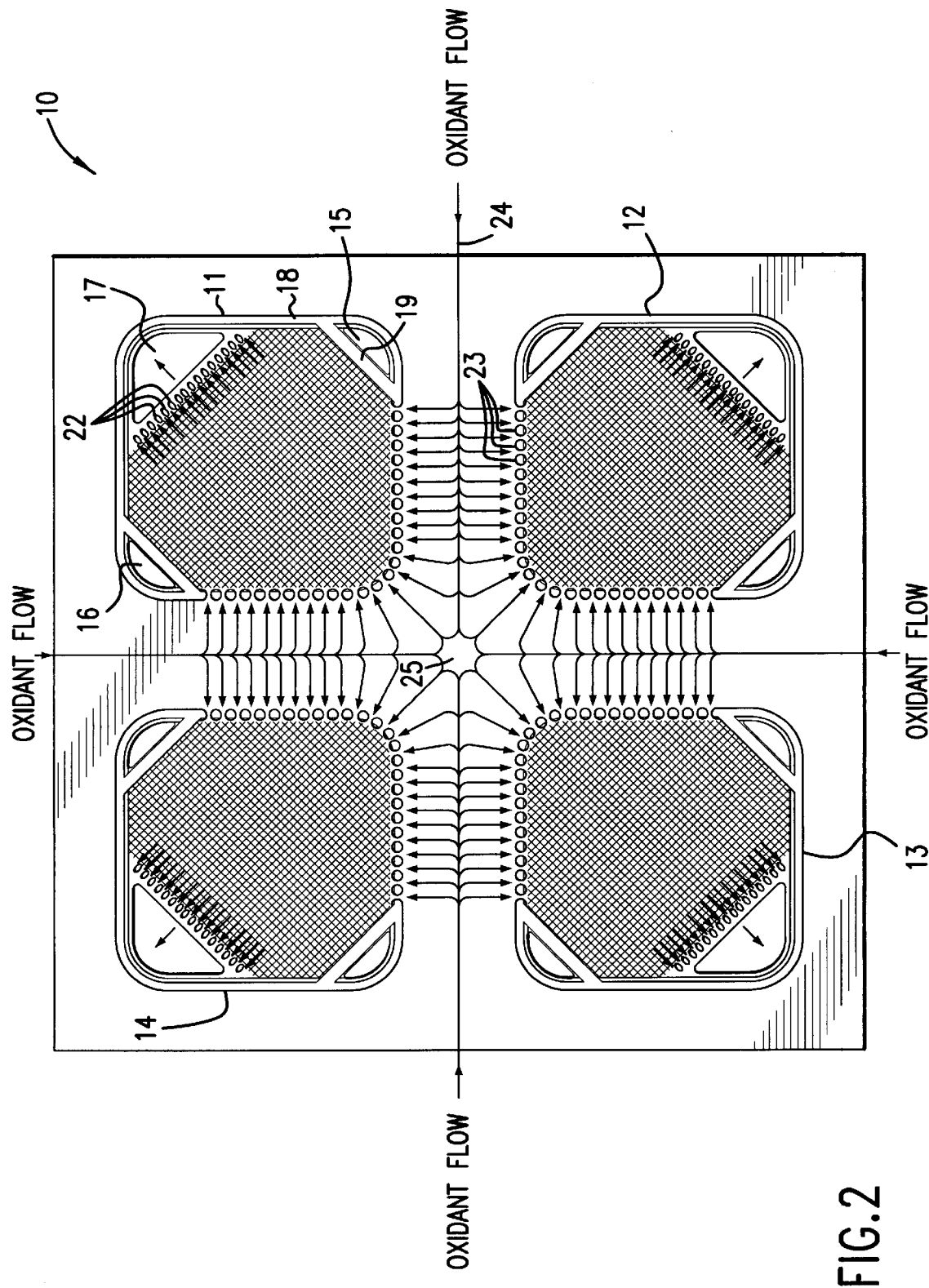
FIG. 2 is schematic diagram of the cathode, or oxidant, side of the finned internal manifold oxidant cooled separator plate shown in FIG. 1.

In accordance with one preferred embodiment of this invention, as shown in FIGS. 1 and 2, separator plate 10 extends a substantial distance beyond the peripheral edges of each sub-stack 11, 12, 13, 14, and separates corresponding fuel cell units in each of sub-stacks 11, 12, 13, 14. Separator plate 10 together with an adjacent separator plate forms an internal oxidant gas flow path 24 from each side of separator plate 10 to center 25 as shown in FIG. 2. Electrolytes 42 and separator plates 10 each have a plurality of aligned perforations, the perforations in separator plates 10 being surrounded by a flattened manifold wet seal structure 19 as shown in FIG. 2 which extends to contact less than about one inch width of electrolyte 42 on each face of separator plate 10, forming a manifold wet seal less than about one inch width under cell operating conditions to form a plurality of gas manifolds 15, 16, 17 extending through each sub-stack 11, 12, 13, 14. Fuel gas conduits 20 through manifold wet seal structure 19 provide fuel gas communication between fuel gas inlet gas manifold 15, anode chambers 45, and fuel gas outlet gas manifold 16 on one face of separator plate 10. Conduits 23 through peripheral wet seal structure 18 provide oxidant gas communication between internal oxidant gas flow path 24 and cathode chambers 46 on the opposite side of separator plate 10. Conduits 22 through manifold wet seal structure 19 provide oxidant gas communication between cathode chambers 46 and oxidant gas outlet gas manifold 17.

Figure 3:
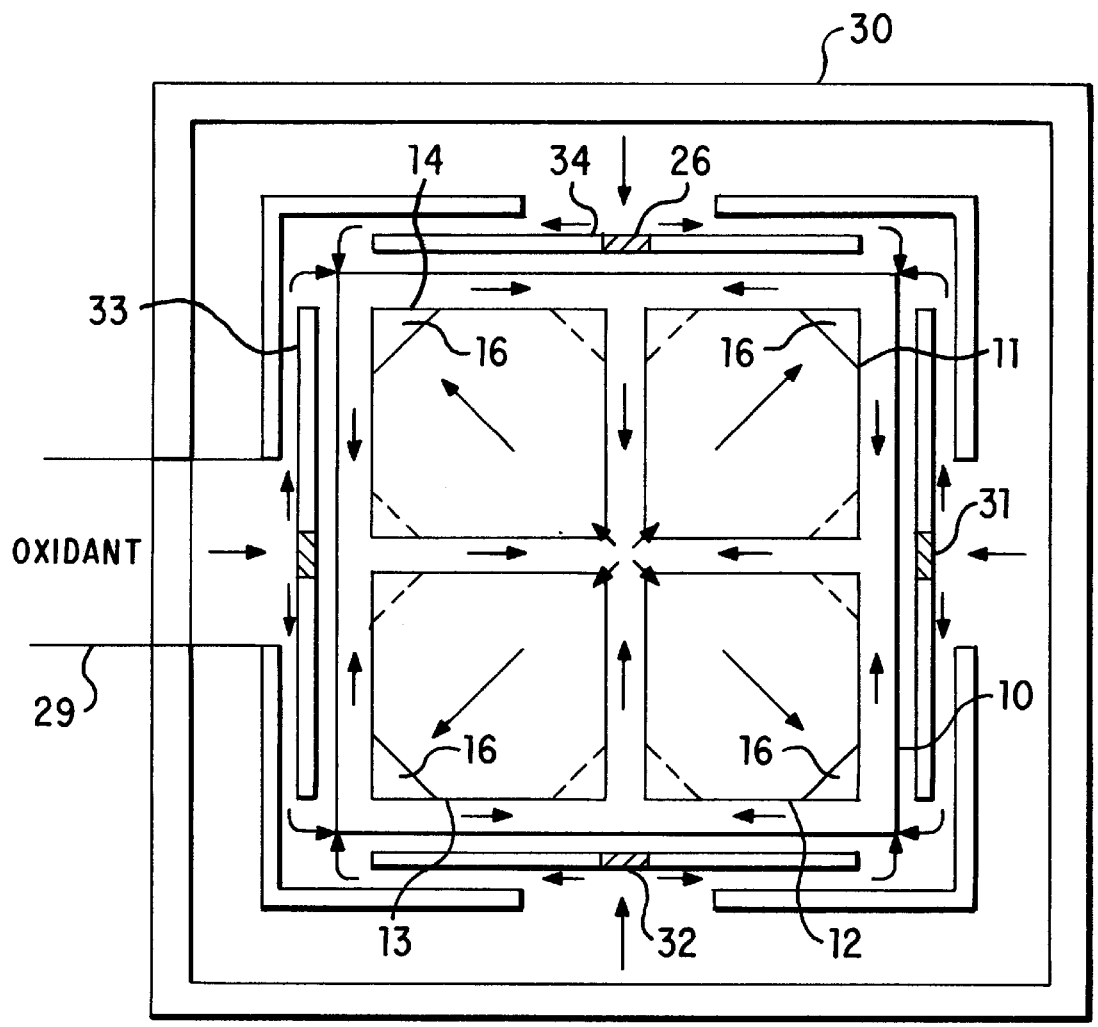
FIG. 3 is a plan view of a fuel cell stack assembly in accordance with one embodiment of this invention showing the oxidant flow cooling pattern.

In accordance with a particularly preferred embodiment of this invention, the fuel cell stack system comprises an insulated containment vessel or insulated pressure vessel 30 which encloses the fuel cell stack assembly. Mounted externally on said fuel cell stack assembly are a plurality of heat flow panels 31, 32, 33, 34, as shown in FIG. 3, which heat flow panels substantially cover the outside surface area of the edges of the separator plates of said fuel cell stack assembly. The fuel cell stack assembly in accordance with one embodiment of this invention utilizes a separator plate having extended exterior edges 21 and an interior housed oxidant gas feed design, combined with vertical heat/flow panels 31, 32, 33, 34 mounted externally on the fuel cell stack assembly to manage the heat generated by the fuel cell stack. Heat generated by the fuel cell stack is used to preheat oxidant gas introduced into containment vessel 30 through oxidant inlet means 29 by being passed along extended separator plate edges 21 as directed by vertical heat/flow panels 31, 32, 33, 34 mounted on the fuel cell stack assembly. Additional oxidant gas preheating and stack cooling is provided by the oxidant flowing across the separator plate 10 through the interior stack oxidant flow paths 24.

FIGS. 1 and 2 show the design features and gas flow patterns of the finned internal manifold oxidant cooled fuel cell stack separator plate system in accordance with one embodiment of this invention. In a typical fuel cell stack, cell separator plates 10 separate individual fuel cells within a fuel cell stack. The function of separator plate 10 is to provide reactant gas to anode 40 and cathode 41, and support the cell's internal components. In addition, separator plate 10 provides wet electrolyte manifold wet seals and peripheral wet seals to prevent reactant gas leakage inside or to the outside of the cell or stack. Internal oxidant gas feed path which extends from the edges of all four sides of separator plate 10 to center 25, and extension of exterior edge 21 of separator plate 10, after completion of the stack assembly, create the oxidant cooling flow pattern that allows control of the internal stack temperatures during operation.

Fuel is supplied to the anode side of separator plate 10 to each of sub-stacks 11, 12, 13, 14 by use of internal fuel gas inlet gas manifolds 15 in separator plate 10. The fuel then enters the anode chamber of each fuel cell unit through fuel gas conduits 20. The fuel flows across an interrupted rib or corrugated pattern formed in separator plate 10 to evenly distribute the fuel across anode 40. The fuel not utilized in the fuel cell reaction flows through fuel gas conduits 20 into fuel gas outlet gas manifold 16 formed in separator plate 10.

Oxidant is supplied to the cathode chamber on the cathode side of separator plate 10 to each sub-stack compartment by entering oxidant gas manifold or oxidant flow path 24 formed by adjacent separator plates and flowing across the separator plate in one of four locations. In accordance with a particularly preferred embodiment of this invention, these oxidant flow paths are void of stamped features, but form a gas channel contained on two sides by the peripheral wet seals of the sub-stacks 11, 12, 13, 14. The oxidant enters the cathode chamber through oxidant inlet conduits 23 formed by separator plate 10. Because the oxidant is supplied to the entire stack assembly from an external supply, no manifold is required. The oxidant flows through an interrupted rib pattern formed in separator plate 10 to evenly distribute the oxidant across cathode 41.

FIG. 3 shows the oxidant flow cooling patterns as the oxidant is allowed to flow from the outside of the fuel cell stack assembly. The oxidant is supplied to the fuel cell stack assembly from an insulated containment or pressure vessel 30 in accordance with this embodiment. This allows the oxidant to be efficiently utilized for fuel cell stack cooling. The oxidant first enters the fuel cell stack assembly from outside of vertical heat/flow panels 31, 32, 33, 34 which are used as heat shields to direct the stack temperature and oxidant gas flow. Vertical heat/flow panels 31, 32, 33, 34 are mounted externally on the fuel cell stack assembly and cover substantially all of the outside surface area of the separator plate edges of the stack assembly. The oxidant begins preheating as it passes through a flow path created by gaps in vertical heat/flow panels 31, 32, 33, 34 as indicated by the arrows. The oxidant first contacts the outside corners of the fuel cell stack assembly at the cathode gas outlet gas manifold 16, the hottest temperature region because of the flow of oxidant leaving the active area of the cells. Vertical heat/flow panels 31, 32, 33, 34 direct the oxidant flow across the extended edges of separator plate 10, thereby providing additional oxidant heating and stack cooling from the transfer of heat to the flowing oxidant. Upon entering oxidant flow path 24 formed by two adjacent separator plates, additional stack cooling is provided by the transfer of heat to the oxidant gas flow from the separator main plate gas channel surface.

An essential feature of the fuel cell stack of this invention is the use of the extended surfaces of the separator plate as heat exchanger surfaces or a heat sink. By careful arrangement and layout of the fuel cell serviced by the separator plate, a uniform flow pattern is achieved which can provide more uniform cell temperatures. The required surface area for the extended exterior edge of the separator plate is determined by the entry temperature of the reactant gas (oxidant); gas flow rate per cell; and the heat generated by cell operation to determine the area required for heat transfer that meets the required cooling requirements. The same design approach is applicable for designing the exterior heat/flow panels 31, 32, 33, 34 and interior oxidant flow path entry area across separator plate 10.

In accordance with one preferred embodiment of this invention, the fuel cell stack assembly comprises heater means 26, shown in FIG. 3, for heating heat/flow panels 31, 32, 33, 34 during start up of the fuel cell stack assembly.

In accordance with one preferred embodiment of this invention, said containment vessel or pressure vessel 30 comprises an inner lining of stainless steel.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In a fuel cell stack system having a fuel cell stack assembly comprising a plurality of sub-stacks, each of said sub-stacks comprising a plurality of individual fuel cell units, each of said fuel cell units comprising an anode and a cathode, an electrolyte in contact on one side with an electrolyte facing face of said anode and in contact on the opposite side with an electrolyte facing face of said cathode, and a separator plate separating said fuel cell units between said anode of one said fuel cell unit and said cathode of an adjacent said fuel cell unit forming an anode chamber between the anode facing face of said separator plate and said anode and forming a cathode chamber between the opposite cathode facing face of the cathode of said adjacent said fuel cell unit, said anode chamber in gas communication with a fuel gas supply and outlet and said cathode chamber in gas communication with an oxidant gas supply and outlet, said electrolyte and said separator plate extending to the peripheral edges of said sub-stack, said separator plate having a flattened peripheral wet seal structure extending to contact less than about 1 inch width of said electrolyte on each face of said separator plate completely around their periphery, forming a peripheral wet seal less than about 1 inch width under cell operating conditions, the improvement comprising:

said separator plate extending a substantial distance beyond the peripheral edges of said sub-stack and separating corresponding fuel cell units in each of said sub-stacks;

said separator plate together with an adjacent separator plate forming an internal oxidant gas feed path to a center of said separator plate from each side of said separator plate;

said electrolytes and said separator plates each having a plurality of aligned perforations, said perforations in said separator plates being surrounded by a flattened manifold wet seal structure extending to contact less than about 1 inch width of said electrolyte on each face of said separator plate, forming a manifold wet seal less than about 1 inch width under cell operating conditions to form a plurality of gas manifolds extending through each of said sub-stacks;

conduits through said extended manifold wet seal structure providing fuel gas communication between a fuel gas inlet gas manifold, said anode chambers, and a fuel gas outlet gas manifold on one face of said separator plate;

conduits through said peripheral wet seal structure providing oxidant gas communication between each said internal oxidant gas feed path and said cathode chambers on the other face of said separator plate; and conduits through said extended manifold wet seal structure providing oxidant gas communication between said cathode chambers and an oxidant gas outlet gas manifold.

2. A fuel cell stack system in accordance with claim 1 further comprising one of an insulated containment vessel and an insulated pressure vessel, said one of said insulated containment vessel and said insulated pressure vessel enclosing said fuel cell stack assembly.

3. A fuel cell stack system in accordance with claim 2 further comprising a plurality of heat flow panels mounted externally on said fuel cell stack assembly so as to substantially cover the outside surface area of the separator plate edges of said fuel cell stack assembly.

4. A fuel cell stack assembly in accordance with claim 2 further comprising oxidant inlet means for introducing oxidant into said one of said insulated containment vessel and said insulated pressure vessel.

5. A fuel cell stack assembly in accordance with claim 3 further comprising heater means for heating said heat flow panels during start-up of said fuel cell stack assembly.

6. A fuel cell stack assembly in accordance with claim 2, wherein said one of said insulated containment vessel and said insulated pressure vessel comprises an inner lining of stainless steel.

7. A fuel cell stack system comprising:

a plurality of fuel cell sub-stacks, each of said fuel cell sub-stacks comprising a plurality of individual fuel cell units, each of said fuel cell units comprising an anode, a cathode, and an electrolyte in contact on one side with an electrolyte facing face of said anode and in contact on the opposite side with an electrolyte facing face of said cathode, said electrolyte extending to a fuel cell sub-stack periphery of each of said fuel cell sub-stacks;

a separator plate separating a corresponding fuel cell unit of each of said fuel cell sub-stacks from a corresponding adjacent said fuel cell unit between said anode of each said corresponding fuel cell unit and said cathode of each said corresponding adjacent said fuel cell unit and extending beyond the periphery of each said fuel cell sub-stack;

said separator plate having a flattened peripheral wet seal structure extending to contact less than about 1 inch width of said electrolyte on each face of said plate completely around the periphery of said electrolyte of each said corresponding fuel cell unit, forming a peripheral wet seal less than about 1 inch width around each said corresponding fuel cell unit of each said fuel cell sub-stack under cell operating conditions;

said separator plate forming an anode chamber between the anode facing face of said separator plate and said anode of each said corresponding fuel cell unit and forming a cathode chamber between the opposite cathode facing face of the cathode of each said corresponding adjacent said fuel cell unit, said anode chamber in gas communication with a fuel gas supply and outlet and said cathode chamber in gas communication with an oxidant gas supply and outlet;

said separator plate together with an adjacent separator plate forming an internal oxidant gas feed path to a center of said separator plate from all sides of said separator plate;

said electrolyte and said separator plate each having a plurality of aligned perforations in each said fuel cell unit, said perforations in said separator plate being surrounded by a flattened manifold wet seal structure extending to contact less than about 1 inch width of said electrolyte on each face of said separator plate, forming a manifold wet seal less than about 1 inch width under cell operating conditions to form a plurality of gas manifolds extending through each of said sub-stacks;

conduits through said extended manifold wet seal structure providing fuel gas communication between a fuel gas inlet gas manifold, said anode chambers, and a fuel gas outlet gas manifold on one face of said separator plate;

conduits through said peripheral wet seal structure providing oxidant gas communication between each said internal oxidant gas feed path and said cathode chambers on the other face of said separator plate; and conduits through said extended manifold wet seal structure providing oxidant gas communication between said cathode chambers and an oxidant gas outlet gas manifold.

8. A fuel cell stack system in accordance with claim 7 further comprising one of an insulated containment vessel and an insulated pressure vessel, said one of said insulated containment vessel and said insulated pressure vessel enclosing said fuel cell stack assembly.

9. A fuel cell stack system in accordance with claim 8 further comprising a plurality of heat flow panels mounted externally on said fuel cell stack assembly so as to substantially cover the outside surface area of the separator plate edges of said fuel cell stack assembly.

10. A fuel cell stack assembly in accordance with claim 8 further comprising oxidant inlet means for introducing oxidant into said one of said insulated containment vessel and said insulated pressure vessel.

11. A fuel cell stack assembly in accordance with claim 9 further comprising heater means for heating said heat flow panels during start-up of said fuel cell stack assembly.

12. A fuel cell stack assembly in accordance with claim 8, wherein said one of said insulated containment vessel and said insulated pressure vessel comprises an inner lining of stainless steel.

* * * * *